United States Patent
Voorhees et al.

(10) Patent No.: US 9,575,624 B2
(45) Date of Patent: *Feb. 21, 2017

(54) SCREEN READER WITH FOCUS-BASED SPEECH VERBOSITY

(71) Applicant: Freedom Scientific, Inc., St. Petersburg, FL (US)

(72) Inventors: Garald Lee Voorhees, Tampa, FL (US); Glen Gordon, Madison, WI (US); Eric Damery, Odessa, FL (US)

(73) Assignee: Freedom Scientific, St. Petersburg, FL (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/481,225

(22) Filed: Sep. 9, 2014

(65) Prior Publication Data
US 2014/0380157 A1    Dec. 25, 2014

Related U.S. Application Data

(63) Continuation of application No. 13/592,807, filed on Aug. 23, 2012, now Pat. No. 8,868,426.

(51) Int. Cl.
| | |
|---|---|
| *G10L 13/00* | (2006.01) |
| *G06F 3/0481* | (2013.01) |
| *G09B 21/00* | (2006.01) |
| *G06F 3/0484* | (2013.01) |
| *G06F 3/0489* | (2013.01) |

(52) U.S. Cl.
CPC ......... *G06F 3/04812* (2013.01); *G06F 3/0489* (2013.01); *G06F 3/04847* (2013.01); *G09B 21/005* (2013.01); *G09B 21/006* (2013.01); *G10L 13/00* (2013.01)

(58) Field of Classification Search
USPC .................................................. 704/258–269
See application file for complete search history.

(56) References Cited

U.S. PATENT DOCUMENTS

| | | |
|---|---|---|
| 2006/0241945 A1 | 10/2006 | Morales |
| 2007/0273696 A1 | 11/2007 | Cheng et al. |
| 2008/0163123 A1 | 7/2008 | Bernstein |
| 2009/0187950 A1 | 7/2009 | Nicas et al. |
| 2010/0070872 A1 | 3/2010 | Trujillo |
| 2010/0199215 A1 | 8/2010 | Seymour et al. |
| 2011/0173539 A1 | 7/2011 | Rottler et al. |
| 2011/0185301 A1 | 7/2011 | Geller et al. |

OTHER PUBLICATIONS

International Search Report for PCT/US2013/049557, International filing date Jul. 8, 2013, with a mailing date of Jan. 6, 2014.
International Preliminary Report on Patentability for PCT/US2013/049557, International filing date Jul. 8, 2013, with a mailing date of Feb. 24, 2015.
European Extended Search Report issued on Mar. 9, 2016 for corresponding European Application No. 13830336.7.

*Primary Examiner* — Jesse Pullias
(74) *Attorney, Agent, or Firm* — Andriy Lytvyn; Anton J. Hopen; Smith & Hopen, P.A.

(57) ABSTRACT

The amount of speech output to a blind or low-vision user using a screen reader application is automatically adjusted based on how the user navigates to a control in a graphic user interface. Navigation by mouse presumes the user has greater knowledge of the identity of the control than navigation by tab keystroke which is more indicative of a user searching for a control. In addition, accelerator keystrokes indicate a higher level of specificity to set focus on a control and thus less verbosity is required to sufficiently inform the screen reader user.

11 Claims, 7 Drawing Sheets

SCREEN READER WITH FOCUS-BASED SPEECH VERBOSITY

CROSS REFERENCE TO RELATED APPLICATIONS

This application is a continuation of U.S. Nonprovisional patent application Ser. No. 13/529,807 filed Aug. 23, 2012, entitled "Screen Reader with Focus-Based Speech Verbosity."

BACKGROUND OF THE INVENTION

1. Field of the Invention

This invention relates to software for low vision users. More specifically, it relates to a screen magnifier application that automatically adjusts speech output verbosity based on how a user arrives at an object's focus.

2. Brief Description of the Related Art

Personal computers and the Internet greatly enhanced communications and access to information from around the world. Typically, visual information is displayed upon a monitor screen and data can be added or manipulated via keystrokes upon an associated keyboard. Feedback is provided visually to the user by the monitor screen. Blind users cannot utilize the information appearing upon the monitor screen while visually impaired users may experience difficulty doing so. Accordingly, screen readers have been developed to assist blind and visually impaired users when they use a personal computer.

A screen reader is software which interprets the output of a computer as sent to a computer screen and converts it into alternative output. Typically, the alternative output is in the form of synthetic speech or Braille characters. Screen readers are particularly useful for a blind or low vision user. One such screen reader is JAWS for Windows developed and sold by Freedom Scientific, Inc., based in St. Petersburg, Fla. When installed upon a personal computer, JAWS provides access to the operating system, software applications and the Internet. JAWS includes a speech synthesizer that cooperates with the sound card in the personal computer to read aloud information appearing upon the computer monitor screen or that is derived through communicating directly with the application or operating system. Thus, JAWS provides access to a wide variety of information, education and job related applications. Additionally, JAWS includes an interface that can provide output to refreshable Braille displays. It should be noted that reference to JAWS is made as an example of a screen reader but the novel and nonobvious software media and methods claimed herein are applicable to screen readers as a whole.

In addition to screen reading, low vision individuals often require magnification of computer screen interfaces to discern text and images. Magnification systems may be built into the operating system itself or may comprise featurerich, third-party products such as those sold under the MAGIC brand also manufactured by Freedom Scientific, Inc. Screen readers and screen magnifiers may work in conjunction so that both interoperate to provide a full array of features to the end user.

One of many useful features that screen readers provide to low-vision end users is the ability to output a description of a control on a graphic user interface. For example, as a user navigates a screen the various buttons, menus, and lists are announced to the user by speech output controlled by the screen reader software. However, the current state of the art outputs the same description regardless as to how to the user arrived at the particular control in the graphic user interface.

Speech output is a double-edged sword to the end user. When needed, it provides the necessary information for the user to understand the context and identity of the graphic user interface control. However, when it is not needed, the speech output becomes a distraction which the end user typically mutes with a keystroke. An end user that navigates about a graphic user interface may invoke the screen reader's speech output seemingly on a continual basis . . . some of the output necessary and some of the output unnecessary.

What is needed in the art is for the screen reader software to evaluate how the end user navigated to a control on the graphic user interface and automatically adjust the verbosity of the speech output to better convey an optimal amount of information to the end user.

However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for variable speech output by a screen reader based on how focus is set on a graphic user interface control is now met by a new, useful, and nonobvious invention. A screen reader software product such as JAWS includes software executable instructions stored in a computer readable medium. The computer readable medium may be optical discs such CDs and DVDs but is trending to downloadable software packages obtained by the end user online. It is also anticipated that some components or features of the present invention may operate remotely or "in the cloud" as processing, storage and other computing activities become more diffuse over high-bandwidth network environments.

Nevertheless, in one embodiment of the invention the software is installed on the computer of the end user. The end user's computer has a computer monitor that displays the graphic user interface of an operating system such as those sold under the WINDOWS brand by Microsoft Corporation out of Redmond, Wash. A graphic user interface has characters and graphics drawn on the screen at various positions, and therefore there is no purely textual representation of the graphical contents of the display.

Screen readers are often forced to employ new low-level techniques, gathering messages from the operating system and using these to build up an "off-screen model", a representation of the display in which the required text content is stored. Operating system and application developers sometimes are able to provide alternative and accessible representations of what is being displayed on the screen through an API. Some APIs useful for screen reading software include Apple Accessibility API; AT-SPI; IAccessible2; Microsoft Active Accessibility (MSAA); Microsoft UI Automation; and Java Access Bridge. Screen readers can query the operating system or application for what is currently being displayed and receive updates when the display changes. For example, a screen reader can be told that the current focus is on a button and the button caption to be communicated to the user. This approach is considerably easier for screen readers, but fails when applications do not comply with the accessibility API. One approach is to use available operating system messages and application object models to supplement accessibility APIs.

The end user's computer will also have, or be coupled to, a speech output module which electronically translates alphanumeric data into human recognizable speech. Various applications are loaded and run through the operating system. It is important to note that the end user in this patent application refers to the low-vision user or "consumer" of the screen reader software. The end user is different from a developer user who authors software or web pages and has write access to the "source code" or instructions that determine how a program operates or how a web page is presented through a browser application.

In one embodiment of the invention, the screen reader software hooks into the event messaging of the operating system running on the computer. The operating system displays a graphic user interface having an end user operable control focusable by both keyboard and mouse input. A control is an element of the graphical user interface that displays an information arrangement changeable by the end user, such as a window or a text box. The characteristic of the control is to provide a single interaction point for the direct manipulation of a given kind of data. Controls may include buttons, check boxes, radio buttons, sliders, list boxes, spinners, drop-down lists, menus, toolbars, combo boxes, icons, tree views, grid views, links, scrollbars, text boxes, labels, tooltips, status bars, dialog boxes and the like.

The software monitors the event messaging for keyboard and mouse events setting focus on the control responsive to end user interaction with the graphic user interface wherein the screen reader automatically outputs to speech a more verbose description of the control responsive to focus set by tab keystroke and a less verbose description of the control responsive to focus set by mouse navigation. Mouse navigated focus on a control has a higher probability that the end user already knows what control he or she has focused on and therefore does not need as much information output to speech.

However, an end user that tabs between controls in a graphic user interface will likely require more information about those controls as he or she may be "hunting" for the appropriate control to manipulate. By way of example, a higher verbosity level set by a tab keystroke focus may output to speech "button . . . save file" while a lower verbosity level set by a mouse over focus may output to speech simply "save file." Alternatively, lower verbosity levels may only include a "ding" sound or even be muted altogether.

Detecting a tab keystroke that sets focus on the control is achieved by hooking into a keyboard callback function and similarly detecting a mouse action setting focus on the control by a mouse hover event is achieved by hooking into a mouse callback function. The screen reader software may include instructions for obtaining, storing, retrieving and implementing end user preferences regarding the verbosity settings for both keyboard and mouse set control focus. This provides a greater level control to the end user and improves the productivity of the end user by not exposing him or her to excessive speech output if such information is not required by the end user.

An alternative embodiment of the invention operates substantially in the same way but distinguishes between tab keystrokes and non-tab keystrokes. Tabbing through a graphic user interface moves the focus from one control to another. Software developers and authors frequently control the tab order so that the controls are arrived at in an intuitive sequence. However, when focus is set on a control by a non-tab keystroke, it is more likely that the user had a more definitive idea of where he or she wanted to navigate. For example, in MICROSOFT WORD 2010 pressing the P key while holding down the control (CTRL) modifier will set focus on a button control to print the current document. These combinations of keys are also known as keystroke accelerators. The screen reader software according to the current invention will presume this precise keystroke sequence is indicative of the end user knowing exactly what control he or she intended to invoke. Therefore, there is little need to output a lengthy description of the print button control. It might simply output "print" or a sound or even nothing as there is a high level of confidence the end user already knows he or she has set focus on the button to print the document.

Another type of keystroke accelerator is a function key which may be used alone or in combination with modifier keys. In an embodiment of the invention a less verbose description of the control is outputted responsive to the function key setting focus on a control relative to a non-tab keystroke that consists of a single key down which is not a function key.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
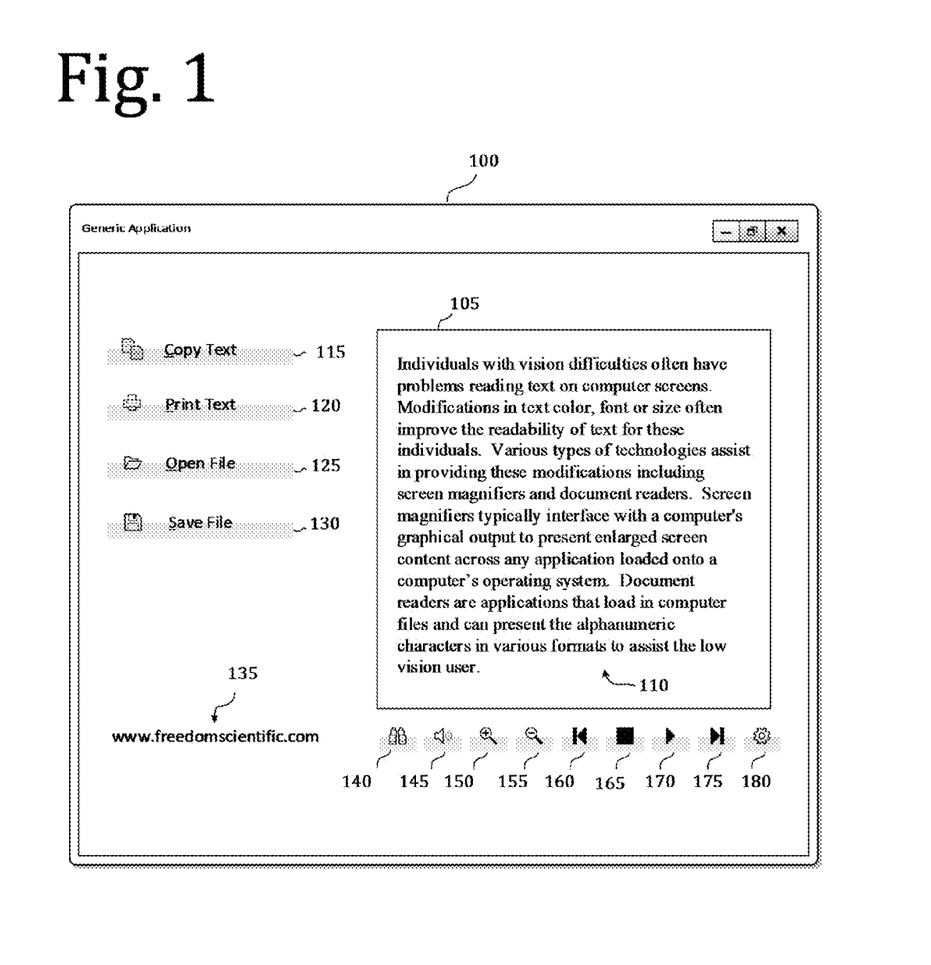
FIG. 1 is a conceptual view of a graphic user interface having a plurality of controls.

An exemplary graphic user interface is denoted as a whole in FIG. 1. The application is entitled "Generic Application" and is presented as dialog box 100. Text box 105 contains arbitrary text 110. Four buttons on the left side of dialog box 100 include copy text button 115, print text button 120, open file button 125 and save file button 130. Hyperlink 135 is positioned below the four buttons. Below text box 105 are find button 140, sound button 145, zoom in button 150, zoom out button 155, back button 160, stop button 165, play button 170, forward button 175 and settings button 180. In FIG. 1 there are no control elements in focus.

Figure 2:
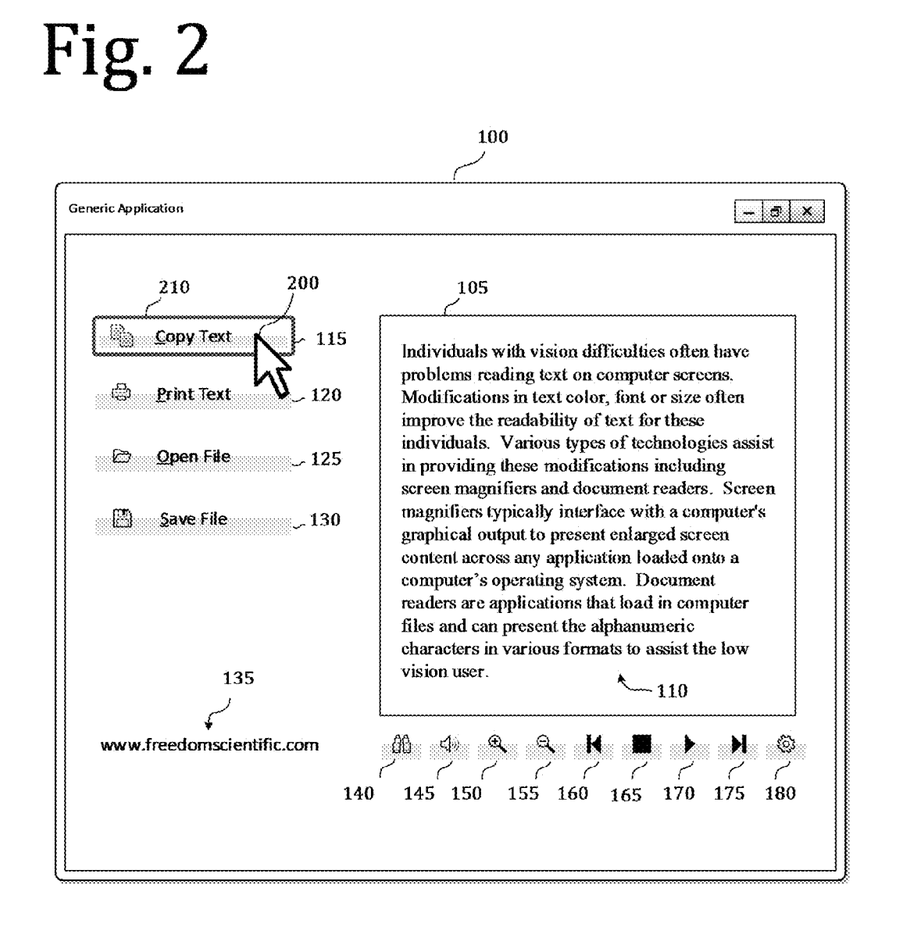
FIG. 2 is a conceptual view of a graphic user interface with focus set by a mouse pointer.

In FIG. 2, mouse indicia 200 hovers over copy text button 115 putting it in focus 210 as visually apparent from the change in the border of copy text button 115. A low vision user hovering over copy text button 210 with mouse indicia 200 will likely already know which control they indicated to activate. Therefore, it is undesirable to output a lengthy description of the copy text button 115 to the end user. For the situation in FIG. 2, the verbosity may be automatically set low by the screen reader software so that only "copy" is output to speech. Alternatively, there may be a special sound associated with the copy command which is output or possibly no output is made in this instance because of the high confidence level the end user knows what control they are focused on.

Figure 3:
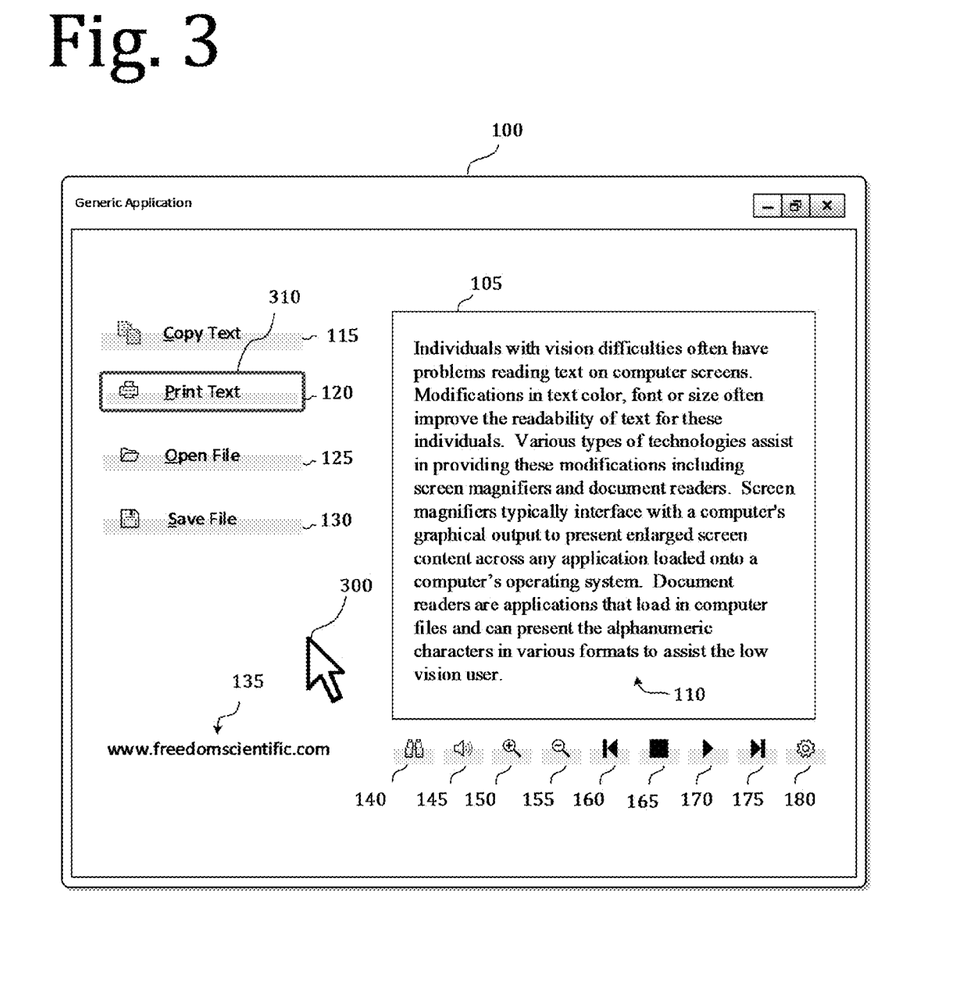
FIG. 3 is a conceptual view of a graphic user interface with focus set by a tab keystroke.

In FIG. 3, mouse indicia 300 is not on any control but print text control button 120 has focus set 310 by a tab keystroke. Tabbing through all the controls in dialog box 100 is more indicative of an end user that requires more information output to speech so they are aware of which control upon which focus is set. In this tab-navigation example, the screen reader software is more verbose in its output compared to a mouse-based focus event. Therefore, the speech output from the tab-navigation may be "Button: Print Text."

Figure 4:
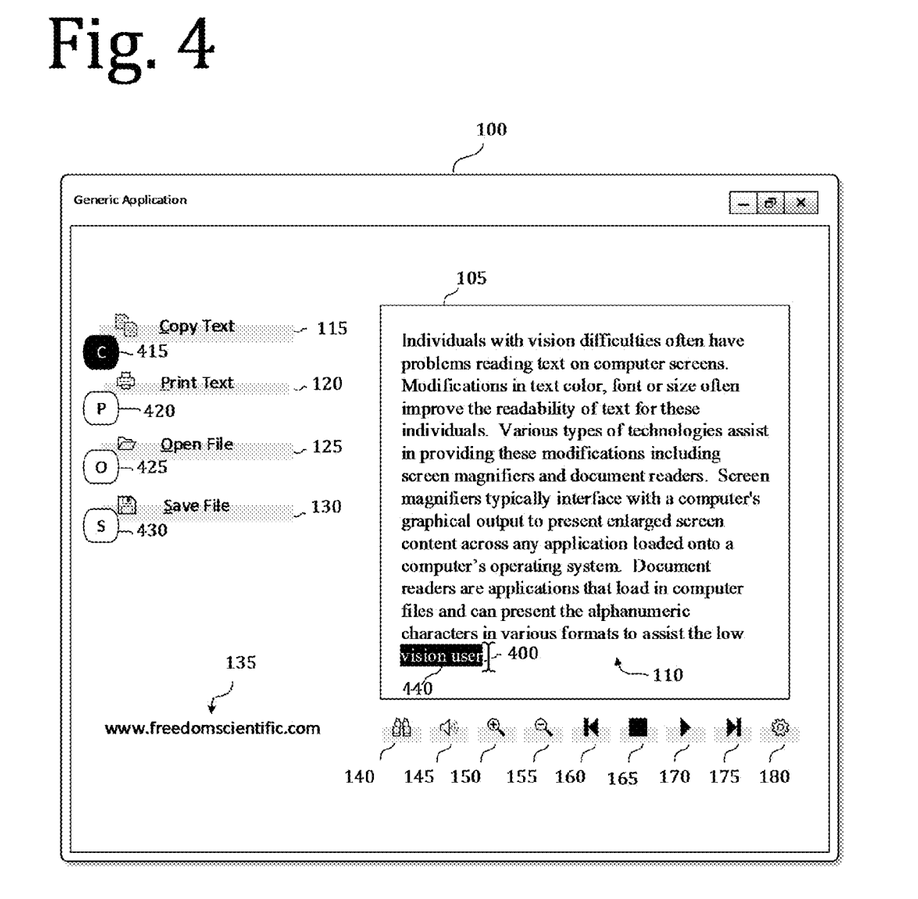
FIG. 4 is a conceptual view of a graphic user interface with focus set by an accelerator keystroke.

In FIG. 4, end user has highlighted 440 a portion of text 110 using caret 400. A CTRL-C keystroke combination invokes focus on a popup copy indicia 415. In this case, the need for speech output detail is extremely low because the end user invoked a precise keystroke combination that will place highlighted text 440 onto the clipboard of the operating system. Short, non-textual audible indicia such as a ding or chime may complete the feedback loop for the end user in this situation.

Figure 5:
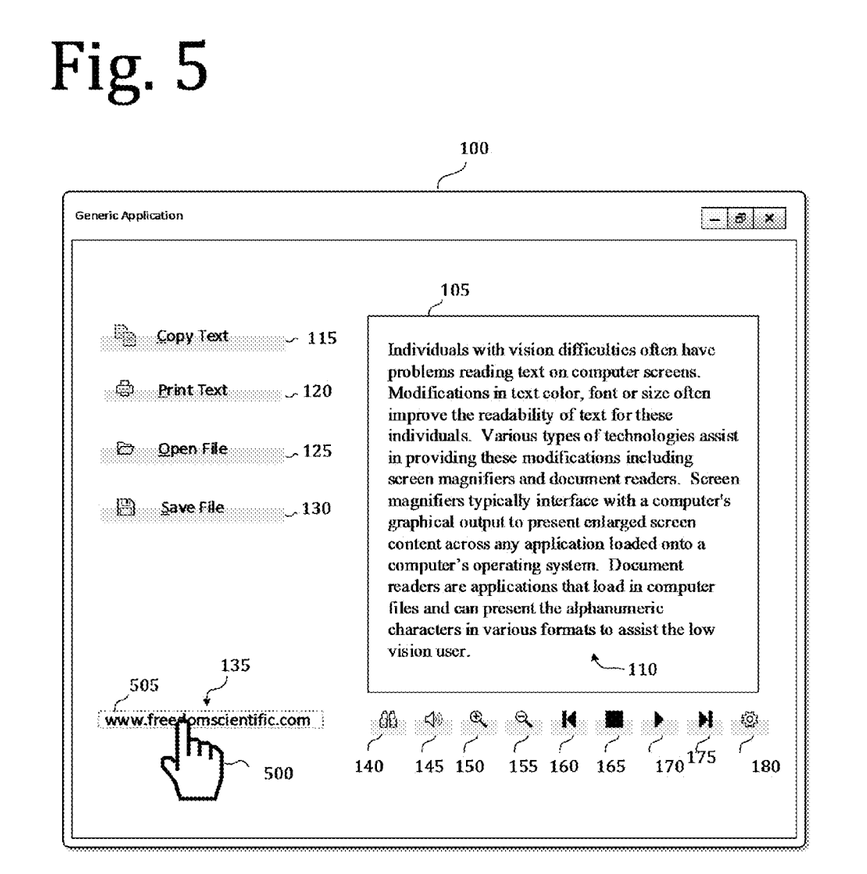
FIG. 5 is a conceptual view of a graphic user interface with focus set by a mouse hover event.

In FIG. 5, a mouse hover over link 135 changes the mouse indicia 500 to a hand cursor and sets a new focus 505 over link 135. As the mouse navigation conveys a presumption of end user awareness the verbosity level may be adjusted downward. However, as the control is specific to a designated URL, only the URL identification (or an ALT description tag thereof) may be output to speech by the screen reader. In contradistinction, had the end user navigated to link 135 by tab keystroke a more verbose output may indicated first the type of control being a hyperlink.

Figure 6:
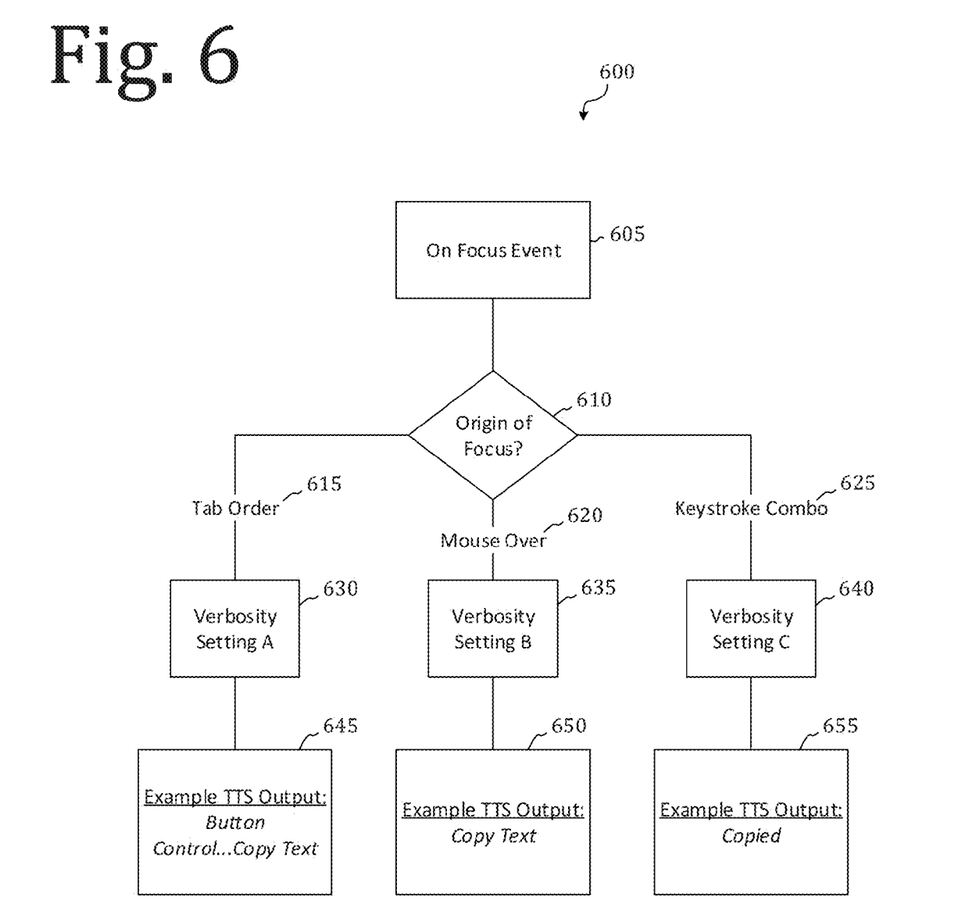
FIG. 6 is a diagrammatic view of an embodiment of the invention setting verbosity levels by focus events.

FIG. 6 shows a flow chart process of an embodiment of the invention 600 which first detects an on focus event 605 through event messaging in the operating system of the computer running the screen reader application. The origin of focus 610 is determined as either a tab order 615, a mouse over 620 or a keystroke combination 625. It should be noted that alternative mouse and keyboard events are anticipated and included within this invention such as scrolling a mouse wheel and other input events enacted by the end user that set focus on a control.

Responsive to tab order 615, verbosity setting A is set 630. Text to speech (TTS) output 645 generates "Button Control . . . Copy Text." Responsive to mouse over 620, verbosity setting B 635 is set. TTS output 650 generates "Copy Text." Responsive to keystroke combination 625 (e.g., CTRL-C), verbosity setting C 640 is set. TTS output 655 generates "Copied" which indicates that the text has already been copied. In this example, focus is set by tab order 615 and mouse over 620 but in keystroke 625 the function was automatically executed and no focus change effected.

Figure 7:
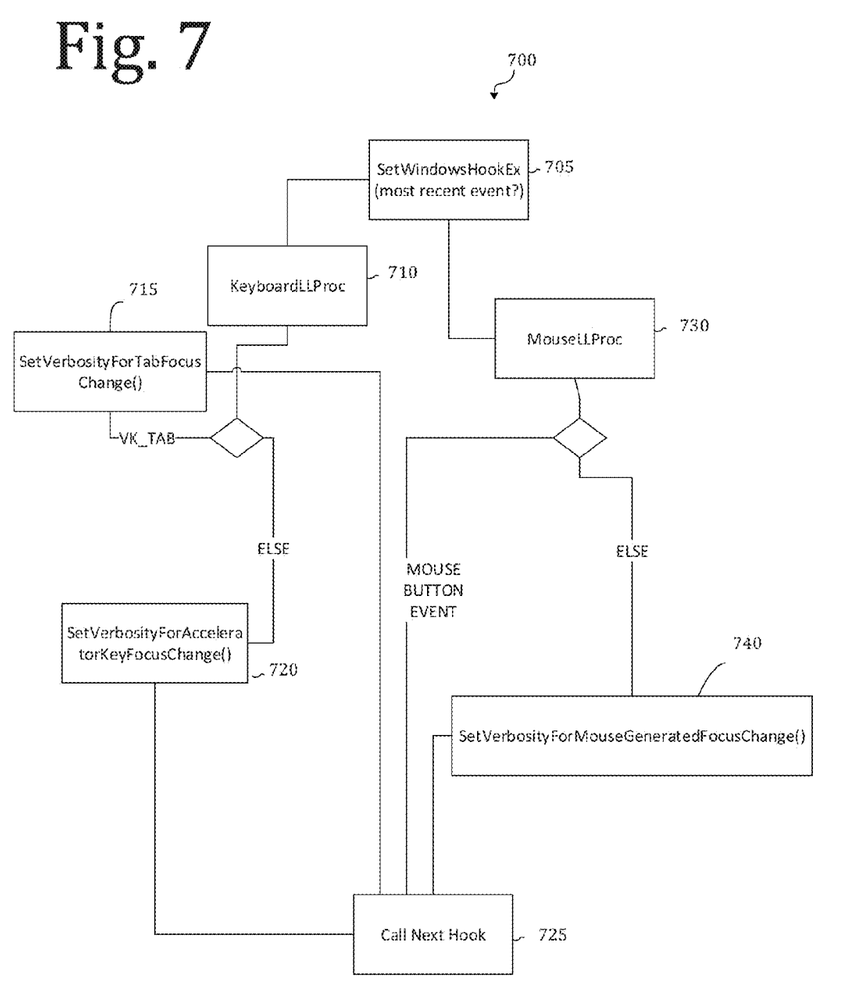
FIG. 7 is a diagrammatic view of another embodiment of the invention setting verbosity levels by focus events.

In FIG. 7, a Win32 API function called SetWindowsHookEx 705 allows installing a system-wide keyboard and/or mouse hook. Using these hooks it's possible to detect whether a keyboard or mouse event was the most recent input and act accordingly. For a keyboard event, KeyboardLLProc function 710 determines whether a tab keystroke (VK_TAB) was received. If so, it sets the verbosity for tab focus change 715. Alternatively, if the keystroke received was not VK_TAB then the verbosity is set for an accelerator key focus change 720 which is less verbose. The next hook is then called 725.

For a mouse event, MouseLLProc function 730 determines if the mouse event was a button event. This would activate the control, not just set focus so the next hook is called 725. However, if the mouse event is anything other than a left mouse button down, middle mouse button down or right mouse button down then the verbosity is set for a mouse generated focus change 740. After that, the next hook is called 725.

As an illustrative example, the following tables show how verbosity levels may be adjusted according to how focus on a control is arrived at:

TABLE 1

| Control | Button | Listbox | Hyperlink |
| --- | --- | --- | --- |
| Tab Focused | Button: Save File | Listbox, Shipping Options, 10 items | Hyperlink: Launch Google Patents |
| Accelerator Focused | Save File | Shipping Options, 10 items | {ding} Google Patents |
| Mouse Focused | Save | Shipping | {ding} |

As seen in Table 1, tab focus events output more lengthy (verbose) speech compared to accelerator keystroke focus events. Mouse focus event still produce even more terse output which may include only a sound ("ding") when hovering over a hyperlink. In all cases where verbosity is reduced, it is anticipated that an embodiment of the invention permits the end user to direct the screen reader to output a more verbose description upon demand.

Functionally, the screen reader software has a host of information to output to speech regarding a control. Setting the verbosity may involve selectively outputting or suppressing the control type, control identity, control state, control item count and the like. An alternative embodiment of the invention may also reduce verbosity with string handling techniques such as outputting only the first word in a control description such as that shown in Table 1 for mouse focused listbox output which trimmed the string "Shipping Options" down to simply "Shipping" using string handling functions to find the integer location of the first space in the description and stopping the speech output at that location.

Hardware and Software Infrastructure Examples

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

GLOSSARY OF TERMS

Audible Cue is an unobtrusive sound that may be played in sequence or concurrently with text-to-speech or Braille to indicate the web page being output has been modified by a customization rule.

Braille is a method that is widely used by people who are visually impaired to read and write. A Braille display is an electronic, pin-actuated, computer controlled peripheral that outputs Braille to a visually impaired user. Examples include the FOCUS 40 and FOCUS 80 Braille displays designed, manufactured and sold by Freedom Scientific, Inc.

Dialog Box is typically a separate window generated in a software application that presents information to an end user and more often, presents options for an end user to select. A modal dialog box restricts activity to that box and does not permit other interaction in the software application until the modal dialog box is closed. For the purposes of this patent specification, the dialog box may be presented on the graphic user interface but will also be identified by non-visual output via the screen reader to convey selection options to the end user.

End user: is the person controlling the screen reader software. For the purposes of this patent specification, user and end user are used interchangeable. User and end user should not be confused with a developer or author . . . one that programs software code or a website designer or content generator that authors a web page.

Focus is the state of a control in a graphic user interface indicating it is targeted for end user interaction. This may be achieved by keystrokes and/or mouse navigation over the location of the control. In most environments, setting focus visually changes the appearance of the control by creating a slight variation in background of the control and/or its border. Non-visual feedback may be tactile and audio-based. Once a control is in focus, further user interaction by mouse or keyboard manipulates the control. For example, a button in focus may be activated by depressing the enter key or by a left mouse down click. A drop-down list in focus may be further manipulated by depressing the up and down arrow keys on the keyboard or the scroll wheel on a mouse. However, if focus is not on these controls, the downstream user interaction will not manipulate the controls as intended. Therefore, it is important for the end user to be aware that focus exists on the proper control prior to interacting with it.

Hooks are points in the system message-handling mechanism where an application can install a subroutine to monitor the message traffic in the system and process certain types of messages before they reach the target window procedure.

KBDLLHOOKSTRUCT structure contains information about a low-level keyboard input event. It is specific to the MICROSOFT WINDOWS operating system.

Keyboard accelerator (or, simply, accelerator) is a keystroke or combination of keystrokes that generates a WM_COMMAND or WM_SYSCOMMAND message for an application. It is specific to the MICROSOFT WINDOWS operating system.

KeyboardProc callback function is an application-defined or library-defined callback function used with the SetWindowsHookEx function. The system calls this function whenever an application calls the GetMessage or PeekMessage function and there is a keyboard message (WM_KEYUP or WM_KEYDOWN) to be processed. It is specific to the MICROSOFT WINDOWS operating system.

Keystroke Commands are one or more keystrokes typically made on a QUERTY-type keyboard for executing a procedure or function on the screen reader software. Keystroke commands are particularly useful for screen reader manipulation as the visually impaired end user can navigate a keyboard far more reliably than setting a coordinate-based pointing device indicia over a specific graphic user interface control.

LowLevelMouseProc callback function is an application-defined or library-defined callback function used with the SetWindowsHookEx function. The system calls this function every time a new mouse input event is about to be posted into a thread input queue. It is specific to the MICROSOFT WINDOWS operating system.

Modifier keys are special keys that modify the normal action of another key, when the two are pressed in combination. For example, <Alt>+<F4> in MICROSOFT WINDOWS will close the program in an active window. The most widely used modifier keys include the Control key, Shift key and the Alt key.

Non-textual Sound Indicia means any sound that may have an arbitrary meaning By way of non-limiting examples, these sounds may include alarm, alert, beeper, bell, buzzer, chime, foghorn, horn, siren, slide whistle, sonar, whistle, wind chimes, ambiance, bang, beep, blip, bloop, boing, boop, button, buzz, cartoon noises, chirp, clang, clank, clap, click, clink, crack, creak, crunch, cut, ding, Doppler, drop, electricity, fall, fanfare, flap, growl, hiss, howl, hum, knock, leak, metal, Morse code, noise, pop, rattle, ring, rip, roar, robot, rustle, scrape, scratch, screech, shuffle, sizzle, skid, snap, snip, sparks, splash, splat, spring, squeak, squeal, squish, static, steam, stone, swing, tap, tear, thud, tick, tink, underwater, warble, whine, whoosh, and wood.

Non-Visual Medium means a communication methodology that does not rely on visual acuity which would be required for computer screens and monitors. Non-visual mediums include tactile devices such as Braille displays and audio devices such as text-to-speech synthesizers and/or sound cues.

Screen Magnifier is a software application that interfaces with a computer's graphical output to present enlarged screen content. It is a type of assistive technology suitable for visually impaired people with some functional vision. Visually impaired individuals with little or no functional vision usually use a screen reader (see below). Screen magnifiers may also be used in conjunction with screen readers to both enlarge screen content and output said content to Braille or speech.

Screen Reader is a software application that attempts to identify and interpret what is being displayed on the screen (or, more specifically, sent to standard output, whether a video monitor is present or not). This interpretation is then re-presented to the user with text-to-speech, sound icons, or a Braille display device.

SetWindowsHookEx function is an application-defined hook procedure into a hook chain. A developer would install a hook procedure to monitor the system for certain types of events. These events are associated either with a specific thread or with all threads in the same desktop as the calling thread. It is specific to the MICROSOFT WINDOWS operating system.

Storage Medium is generally a hard drive or memory device whether local or remote to save and retrieve data and settings.

Tab Order: When an end user tabs from field to field in a form the tab order is the order the fields appear in the HTML code. However, sometimes the HTML author may want the tab order to flow a little differently. In that case, he/she can number the fields using the attribute TAB INDEX. The tabs then flow in order from lowest to highest.

Web Page is a document or information resource that is suitable for the World Wide Web and can be loaded and accessed via a web browser and displayed on a monitor or mobile device. This information is usually in HTML or XHTML format, and may provide navigation to other web pages via hypertext links.

Web Page Element: A single feature of web page content, e.g., link, heading, frame, etc. Elements may contain other elements, e.g., frames may contain links.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A non-transitory computer-readable medium having stored thereon computer-executable instructions that, in response to being executed by a computing device, cause the computing device to perform operations comprising:
   hooking into event messaging of an operating system running on the computer, the operating system displaying a graphic user interface having an end user operable control focusable by both keyboard and mouse input;
   monitoring the event messaging for keyboard and mouse events setting focus on the control responsive to end user interaction with the graphic user interface; and
   automatically outputting to speech a first description of the control responsive to focus set by a keystroke and a second description of the control responsive to focus set by mouse navigation.

2. The screen reader software product of claim 1 further including instructions to perform the steps of hooking into a keyboard callback function to detect a tab keystroke setting focus on the control.

3. The screen reader software product of claim 1 further including instructions to perform the steps of hooking into a mouse callback function to detect a mouse action setting focus on the control.

4. The screen reader software product of claim 1 further including instructions to perform the steps of obtaining, storing, retrieving and implementing end-user preferences regarding verbosity settings for both keyboard and mouse set control focus.

5. A non-transitory computer-readable medium having stored thereon computer-executable instructions that, in response to being executed by a computing device, cause the computing device to perform operations comprising:
   hooking into event messaging of an operating system running on the computer, the operating system displaying a graphic user interface having an end user operable control focusable by keystrokes;
   monitoring the event messaging for keyboard events setting focus on the control responsive to end user interaction with the graphic user interface;
   responsive to detecting a keyboard callback function, setting a first verbosity level responsive to a tab keystroke and setting a second verbosity level responsive to a non-tab keystroke; and
   automatically outputting to speech a first description of the control responsive to focus set by tab keystroke and a second description of the control responsive to focus set by the non-tab keystroke, wherein the first description is outputted at the first verbosity level and the second description is outputted at the second verbosity level.

6. The screen reader software product of claim 5 further including instructions to perform the steps of:
   detecting if the non-tab keystroke is a keystroke accelerator comprising a simultaneous combination of keystrokes; and
   outputting a less verbose description of the control responsive to the combination of keystrokes relative to a non-tab keystroke that consists of a single key down.

7. The screen reader software product of claim 5 further including instructions to perform the steps of:
   detecting if the non-tab keystroke is a keystroke accelerator comprising a function key; and outputting a less verbose description of the control responsive to the function key relative to a non-tab keystroke that consists of a single key down which is not a function key.

8. A method of automatically adjusting a verbosity of an audible description of a graphic user interface control by a screen reader software application, the method comprising the steps of:

hooking into event messaging of an operating system running on a computer, the operating system displaying the graphic user interface having an end user operable control focusable by both keyboard and mouse input;

monitoring the event messaging for keyboard and mouse events setting focus on the control responsive to end user interaction with the graphic user interface; and automatically outputting to speech a first description of the control responsive to focus set by a keystroke and second description of the control responsive to focus set by mouse navigation, wherein the first and the second description of the control are output at different verbosity levels.

9. The method of claim 8 wherein the description of the control is performed by a speech synthesizer communicatively coupled to the screen reader software.

10. The method of claim 8 wherein the description output responsive to mouse navigation is non-textual sound indicia.

11. The method of claim 8 wherein no sound is output responsive to mouse navigation that sets focus on the control.

* * * * *

UNITED STATES PATENT AND TRADEMARK OFFICE
CERTIFICATE OF CORRECTION

| | | |
|---|---|---|
| PATENT NO. | : 9,575,624 B2 | Page 1 of 1 |
| APPLICATION NO. | : 14/481225 | |
| DATED | : February 21, 2017 | |
| INVENTOR(S) | : Garald Lee Voorhees et al. | |

It is certified that error appears in the above-identified patent and that said Letters Patent is hereby corrected as shown below:

On the Title Page

Item (73) Assignee should read:
(73) Assignee: Freedom Scientific, Inc., St. Petersburg, FL (US)

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*